Oct. 26, 1948. P. A. DERHAM 2,452,230
ROTARY LOCK BOX
Filed July 26, 1945
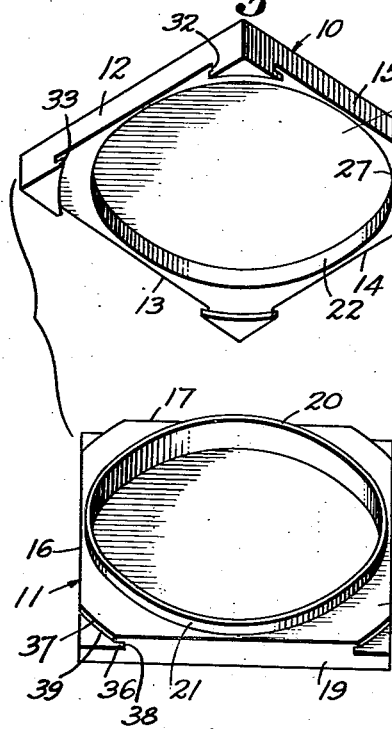
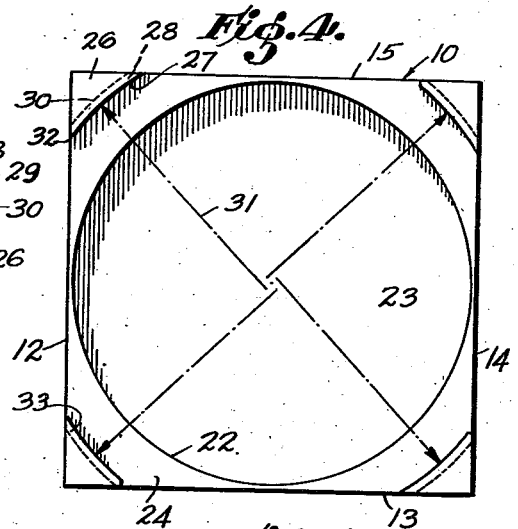
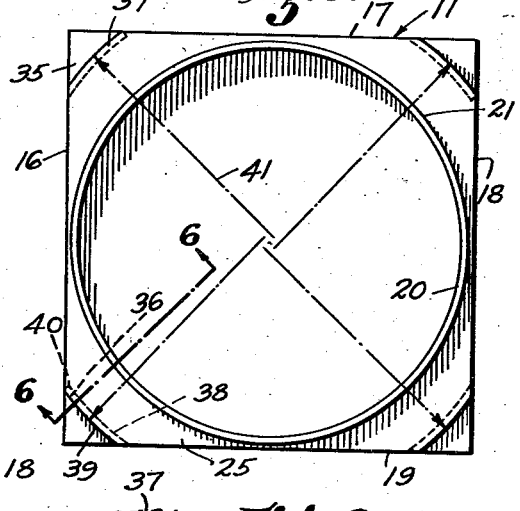
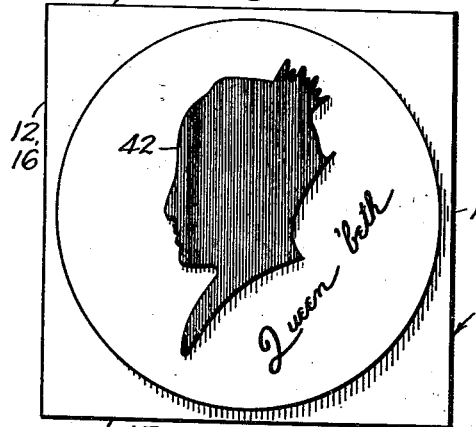
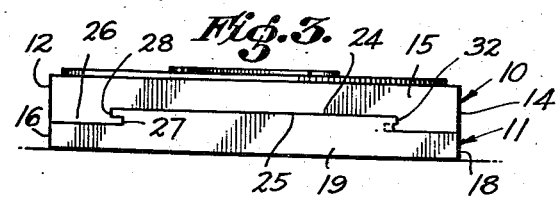
Inventor:
PHILIP A. DERHAM,
by Harry Jackson
Attorney Patented Oct. 26, 1948

2,452,230

UNITED STATES PATENT OFFICE 2,452,230

ROTARY LOCK BOX

Philip A. Derham, Rosemont, Pa., assignor to Victor Metal Products Corporation, Brooklyn, N. Y., a corporation of New York Application July 26, 1945, Serial No. 607,238

10 Claims. (Cl. 220—40)

This invention relates to powder, rouge, pill or the like boxes having removable covers and particularly to rotary closures for such boxes.

The invention contemplates the provision of a pocket size box such as a compact or the like which is adapted to be molded completely and comparatively inexpensively of synthetic plastic material, which is devoid of hinges or screw covers or ordinary locks or fasteners between the cover and container parts of the box, and which carries integrally molded connecting means adequately to lock the box parts together while permitting the quick and easy separation thereof when desired.

The invention further contemplates the provision of a two piece box provided with interlocking parts integral with the members of the box and operative on relative rotation of the members through approximately a quarter turn in one direction to lock the members together and operative in the other direction to unlock said members prior to complete separation thereof.

The invention further contemplates the provision of a box consisting entirely of a pair of similar mating box parts having similar tongue and groove connections therebetween operating with an optional wedging or camming action and interengaging to lock the parts together when said parts are arranged in angular relation and with certain guiding surfaces in contact and then relatively rotated into registration.

The invention further contemplates the provision of an easily molded box comprising two mating parts only with an integral interfitting locking closure on the parts and suitable coacting guiding surfaces, the box being adapted to have an ornamental design integrally molded thereon.

The invention further contemplates the provision of a box having a cover and a container both of identical and preferably polygonal outline and in registration when the box is closed, the cover and container having mating, interengaging and circumferentially spaced connections therebetween, the parts on the cover being identical with each other and the coacting parts on the container also being identical with each other, whereby the cover may be set on the container out of registration therewith and then locked by a quarter turn into registration, suitable stops preventing relative movement of the parts past the registering positions thereof.

The various objects of the invention will be clear from the description which follows and from the drawings, in whch, Fig. 1 is a perspective view of the box showing the parts in the positions assumed thereby just prior to the assembly thereof or just after the unlocking and separation thereof.

Fig. 2 is a top plan view of the box in the normal or locked position thereof.

Fig. 3 is a side elevation of the same.

Fig. 4 is a bottom plan view of the cover part of the box showing the radii of the arcuate surfaces of the male locking members.

Fig. 5 is a top plan view of the container part of the box, showing the radii of the arcuate surfaces of the female locking members.

Fig. 6 is a fragmentary vertical section of the female locking element taken on the line 6—6 of Fig. 5.

In the practical embodiment of the invention shown by way of example, the cover part 10 is preferably square in outline and is intended to rotate through a limited extent, that is, through an angle of about 45° on the container part 11, both of the parts having the same outline for economy of material. It will be understood however, that if any other triangular, polygonal or even circular outline is used for the parts, no unobvious departure need be made from the structure shown and hereinafter described, though if desired, the locking elements may be differently spaced and the container recesses enlarged as will become obvious from what follows. The parts are normally in registration as shown in Figs. 2 and 3 when the box is closed, the sides 12, 13, 14 and 15 of the cover part being then coplanar respectively with the corresponding sides 16, 17, 18 and 19 of the container part. In the separated positions of the parts shown in Fig. 1, and just after the parts have been unlocked, or just prior to reassembling them, the cover part is turned about 45° relatively to the container part.

To insure proper alignment of the parts in all transverse directions, an upstanding cylindrical wall 20 is formed on the container part, the outer surface 21 of the wall being fitted into and slidably engaging the cylindrical surface 22 surrounding the central recess 23 which is formed in the cover part. The surfaces 21 and 22 being of substantially the same diameter and being concentric, the cover and container parts may be rotated relatively about their common axis while accurately maintaining the proper axial alignment thereof. Preferably the height of the wall 20 is somewhat less than the height of the recess 23 to permit sliding engagement and contact of the under sealing surface 24 of the cover part with the upper sealing surface 25 of the container part, thereby determining the exact lateral relation of the parts and preventing leakage of the contents of the box therebetween.

For ease in molding the parts and locking connections thereof and for simplicity of manufacture, the sealing surfaces 24 and 25 are preferably made flat and perpendicular to the common axis of the parts though it will be understood that said surfaces may be angularly disposed to the axis, or may be made conical or of other shape as desired, provided that the surfaces are shaped alike and are adapted to remain in slidable contact with each other during the rotary opening and closing movements of the parts. It will be noted that not only does the flat surface 24 surround the wall 20, but that it terminates at its outer periphery at the sides 12, 13, 14 and 15, being interrupted however, at the integral locking members herein illustrated as being located at the corners of the cover part where sufficient space is provided for the arrangement of said members. Should a box outline other than square be desired, it will be understood that the locking elements may be located at any suitable points in outer spaced relation to the wall 20, at the desired radial distance from the axis of the wall and at suitable circumferentially spaced and equal distances apart.

The locking means on the cover part takes the form of preferably identical projections 26, each having an inner arcuate face 27 preferably slightly eccentric to the wall 20 as shown by the dash-dot radial lines 31 of Fig. 4. Each of the projections is grooved as by means of the groove 28 to form part of a double tongue and groove connection, the projections constituting the male elements of the locking connections. The upper wall 29 of the groove is preferably a continuation of the flat surface 24 and the upright arcuate wall 30 of the groove is preferably concentric with the face 27 but eccentric to the cylindrical wall 20.

At one end of each of the grooves is provided a stop 32 which may be a separate member cemented in place in the groove or may be made by stopping the cut which makes the groove slightly inwardly of the adjacent side of the cover, which is the side 12 in the case of the particular groove shown at the upper left hand corner of Fig. 4. Since the height of the groove is less than the total height of the projection 26, there results a lowermost tongue as 33 projecting inwardly beyond the wall 30 of the groove and having upper and lower faces preferably though not necessarily parallel to the flat surfaces 24. The tongue and groove connection just described constitutes one of a plurality of identical male locking elements integral with the cover part and mating and interengaging with a corresponding female element on the container part.

One of said female elements is similarly provided at each corner of the container part 11 if the box is square and comprises the depression or recess 35 extending below the sealing surface 25 and receiving therein the lower part of the projection 26 when the box is closed. The groove 36 extends upwardly from the bottom of the recess 35 and receives the tongue 33. If the box is other than square, the recesses are made at the proper places in the additional material extending outside of the wall 20 to avoid interference with the projections 26 when the box parts are set on each other in the rotated positions thereof shown in Fig. 1. Since the height of the groove 36 is less than the height of the recess 35, a tongue 37 is formed above said groove in the same manner as the tongue 33 is formed below the groove 28 of the male element on the cover part, the tongue 37 entering the groove 28. The respective widths of the interengaging tongues and grooves are substantially equal to permit the wedging or camming action described hereinafter between the adjacent walls thereof when the parts are relatively rotated into the closed position of the box.

As best seen in Fig. 5, the upright wall 38 of the groove 36 is concentric with the outer wall 39 of the tongue 37, the wall 38 fitting the face 27 and the wall 39 fitting the wall 30. A stop member 40 similar to and cooperating with the member 32 is provided at the proper end of each groove 36 to stop the relative rotation of the parts when they have reached a registering position in which the respective sides of the parts are flush or coplanar with each other. The walls 38 and 39 are eccentric to the surface 21 of the wall 20 in the same manner and for the same purpose as are the corresponding surfaces of the grooves of the cover part. (See the radii 41, Fig. 5.)

The box parts are peculiarly adapted to have ornamentation as 42 integrally molded therein as on the top and bottom since no undercuts need be made on those surfaces.

To assemble the parts and to lock them, the cover part 10 is first arranged as shown in Fig. 1 relatively to the container part 11, that is, with the projections 26 above and outside of the sides of the container part and between the recesses 35. The cover part is then set on the container part, the wall 20 entering the recess 23 and the surfaces 24 and 25 being arranged in contact with each other. In this position, the tongues 33 of the male locking elements 26, while outside of the sides of the container part, are aligned with and ready to enter the grooves 36, while the tongues 37 of the female elements are aligned with and ready to enter the grooves 28 of the male elements. No relative movement of the parts except rotary or lateral movement is now possible. The lateral movement would separate the parts and is used only if the box is to be opened. However, rotary movement in a clockwise direction as viewed in Figs. 1, 2 and 3 carries the respective tongues into the adjacent grooves until further movement is prevented by the engagement of the stops 32 with the corresponding stops 40. All of the male elements being identical and the female elements also being identical, the tongues of any of the male or female elements correctly enter the grooves of the other adjacent element regardless of which male element is first set between any pair of female elements. The stops also being identical, the respective corresponding sides of the cover and container parts are in exact alignment when the relative rotary movement is halted by the stops.

The wall 20 and surface 22 slide on each other and coact to guide the parts during such rotary movement and insure proper interengagement of the tongues and grooves, while the surfaces 24 and 25 insure proper alignment of said tongues and grooves laterally. Owing to the frictional engagement of the arcuate surfaces 27, 38 and 30, 39 the parts are held in their locked positions unless manually moved therefrom. However, a more positive locking action of said surfaces is attained by the eccentricity thereof relatively to the common axis of the wall 20 and the surface 21, said axis determining the path of movement of the box parts and the path of movement of the eccentric surfaces. Since said paths are not parallel to the eccentric surfaces, a wedging or camming action is secured, causing the surfaces 27 and 38 to be wedged slightly on each other and causing the surfaces 30 and 39 to be similarly wedged, thereby locking the box parts firmly together.

Since the tongues of the locking elements fill the recesses or grooves of the coacting elements and since the sealing surfaces 24 and 25 extend as far into the grooves as do the tongues as well as surrounding the wall 20, there remains no space, crack or opening between the box parts through which material contained in the box may leak out. This is important in case the box is used for powder. The contents of the box are easily accessible by reversing the above described movements, that is, by first relatively rotating the parts through an angle of about 45° to carry the male locking elements to points between the female elements and then lifting the cover part off the container part.

It will be seen that I have provided a simple hingeless two part box easily molded with integral locking elements, easily manipulated and well adapted to meet practical manufacturing and use requirements.

Certain obvious changes in the shape of the box and others such as the arrangement of the locking elements or in the positions or number of tongues and grooves therein to conform to change in the box outline may be made without departing from the spirit of the invention, which is defined in the appended claims.

I claim:

1. In a rotary lock box, a square cover part, a square container part, said parts having contacting flat surfaces and cooperating cylindrical laterally extending guiding surfaces, the guiding surfaces having a common axis perpendicular to the flat surfaces, and means for separably locking the parts together in position to form a square box, said means comprising identical laterally extending and arcuately grooved projections at the corners of the cover part, a tongue on each projection below the groove of such projection, concentric arcuate surfaces on the inner end of the tongue and on the outer wall of the groove respectively, said surfaces being slightly eccentric to the cylindrical surfaces, the container part being provided with identical recesses at the corners thereof to receive the respective projections, there being a tongue and a groove at each of said corners of the container part, the tongue being adapted to enter the groove of a projection and the groove being adapted to receive the tongue of a projection, the tongue having an arcuate outer surface and the groove having an arcuate inner surface, said surfaces being eccentric to said axis whereby when the flat surface of the cover part is set on the flat surface of the container part with the projections between adjacent recesses and outside of the container part and the cylindrical guiding surfaces are in contact, and the parts are then relatively rotated to a position in which the parts are in registration, the eccentric surfaces of the tongues and the walls of the grooves are in pressed contact to lock the parts in their assembled relation.

2. A two part moldable box comprising a container part and a cover part separable completely from the container part by a rotary movement from a locked position thereof followed by a lateral movement, and coacting locking means integral with the parts to separably lock said parts together and to limit the relative rotary movement thereof, said means comprising circumferentially spaced identical projections on the cover part each provided with an arcuate groove, the container part having correspondingly spaced identical recesses therein receiving the respective projections in the locked position of the parts, cooperating relatively slidable guiding surfaces on the parts, cooperating stop means on the projections and in the recesses, the locking surfaces of the projections and recesses being eccentric to the axis of the parts thereby to urge the surfaces into pressed contact by a camming action on relative rotation of the parts toward the locked position thereof.

3. In a box, an upper recessed cover part and a lower recessed container part, said parts having a common axis and being locked together and unlocked by relative rotary movement about said axis, and coacting locking means including a plurality of spaced arcuate surfaces on one of the parts engaging similar surfaces on the other of the parts, said surfaces being eccentric to the axis, and sealing surfaces on and extending inwardly from the peripheral sides of said parts toward said axis, said sealing surfaces being in contact with each other and slidable on each other during the relative rotation of the parts, said surfaces serving to position the arcuate surfaces in a direction laterally of the box during said relative rotation.

4. In a box of polygonal outline, a container part of said outline having a central recess therein for holding the contents of the box, an upstanding cylindrical wall surrounding the recess, a sealing surface above the bottom of the recess and below the top of the wall and outwardly surrounding the wall, said sealing surface having a plurality of corner recesses therein, a tongue at each corner of the container part, said tongue projecting outwardly from the sealing surface partway into the adjacent recess and being of lesser height than that of the recess, a cover part of the same outline as that of the container part, said cover part having a central recess therein arranged coaxially of and receiving the cylindrical wall of the container part, a sealing surface on the cover part surrounding the central recess thereof, and a projection at each corner of the cover part having a groove therein for the reception of a tongue of the container part.

5. A moldable two part box in which the parts are relatively rotatable into a locked and registering position, said box comprising a cover part having a given outline and side walls arranged to form said outline, said part having a central recess therein and having a series of spaced identical projections all located the same distance from the axis of said recess, a lower sealing surface on the cover part, a container part having the same outline as the cover part and having side walls arranged to form said outline, said container part having a central recess therein and a cylindrical wall outstanding upwardly beyond the recess and entering the central recess of the cover part, an upper sealing surface on the container part surrounding the cylindrical wall, and circumferentially spaced coacting tongue and groove joints in the projections and at correspondingly spaced points of the container part, the tongues of said joints being arranged to enter the grooves of the joints respectively when the respective sealing surfaces are in contact and the box is locked, the cylindrical wall then entering the central recess of the cover part and the respective side walls of the cover and container parts then being coplanar with each other.

6. In a rotary lock box, a moldable cover part having circumferentially spaced and identical male locking elements each having a tongue and a groove, a moldable container part having similarly circumferentially spaced and identical female locking elements adapted to interlock with the male elements and each having a tongue and a groove; the tongue of each male element entering the groove of a female element and the tongue of each female element entering the groove of a male element when the box is locked; coacting cylindrical guiding surfaces on the parts arranged inwardly of the male and female elements, and sealing surfaces on the parts surrounding the guiding surfaces and in contact when the box is locked.

7. A rotary lock box according to claim 6 wherein each of the tongues and each of the grooves is provided with an arcuate end wall, the end wall of each tongue being in contact with the end wall of a groove when the box is locked.

8. A rotary lock box according to claim 6 wherein the tongues and grooves have arcuate end walls eccentric with the axis of the cylindrical surfaces.

9. A rotary lock box according to claim 6 provided with means limiting the extent of the relative rotary movement of the parts; said means comprising a stop in a selected end of the groove of each female element and a coacting stop in the non-corresponding end of the groove of each male element.

10. A rotary lock box according to claim 6 wherein the respective tongues and grooves in the male and female elements are provided with arcuate end walls, the end walls of the tongues being arranged in contact with the end walls of the respective grooves when the box is locked; said walls being eccentric to the axis of the cylindrical surfaces, and coacting stops at the ends of the respective grooves.

PHILIP A. DERHAM

REFERENCES CITED

The following references are of record in the file of this patent:

UNITED STATES PATENTS

| Number | Name | Date |
|---|---|---|
| 1,617,202 | Dowling | Feb. 8, 1927 |

FOREIGN PATENTS

| Number | Country | Date |
|---|---|---|
| 186,514 | Switzerland | Apr. 1, 1937 |